United States Patent
Berger et al.

[19]

[11] Patent Number: 6,144,116
[45] Date of Patent: Nov. 7, 2000

[54] ANNUNCIATOR WITH INTERNAL TACHOMETER

[75] Inventors: Walter R. Berger; Randol W. Read, both of Houston, Tex.

[73] Assignee: Murphy Industries, Inc., Tulsa, Okla.

[21] Appl. No.: 09/350,618

[22] Filed: Jul. 9, 1999

[51] Int. Cl.[7] .......................................................... H02S 9/06
[52] U.S. Cl. ............................................. 307/116; 307/66
[58] Field of Search ..................... 307/66, 116; 340/520; 123/198 R

[56] References Cited

U.S. PATENT DOCUMENTS 4,181,883   1/1980   Beeghly et al. .
4,336,463   6/1982   Beeghly .
5,563,456   10/1996  Berger .

OTHER PUBLICATIONS

Murphy,S15–96122B, Catalog Section 50, Jul. 1999, 00–02–0255, Murphy, Tulsa, OK.
Murphy,MK3–95052B, Catalog Section 50, Jan. 1998, 00–02–0116, Murphy, Tulsa, OK.
Murphy,SHD3–97050B, Catalog Section 20, Mar. 1999, 00–02–0287, Murphy, Tulsa, OK.

*Primary Examiner*—Josie Ballato
*Assistant Examiner*—Robert L. Deberadinis
*Attorney, Agent, or Firm*—Randol W. Read

[57] ABSTRACT

An annunciator device that utilizes a microprocessor allows for the inclusion of a tachometer or an hourmeter-tachometer, functions that typically require external instruments. A display circuit sequentially provides a digital readout indicative of a fault condition, engine speed and elapsed run time. The system draws sufficiently low current to be powered from a CD ignition or magnetic pickup power supply and backup battery. An annunciator device that allows for the inclusion of a tachometer, or a tachometer and an hourmeter, eliminates a great deal of cost by reducing instrument count, customer wiring, and overall instrument panel size.

6 Claims, 6 Drawing Sheets

ANNUNCIATOR WITH INTERNAL TACHOMETER

BACKGROUND OF THE INVENTION

This invention relates to an annunciator, specifically to a microprocessor-based annunciator with an internal tachometer.

Annunciators are used for control and protection of remotely located internal combustion engines. Annunciators monitor a plurality of sensor inputs indicative of various engine parameters, such as oil pressure, water temperature, and engine speed. If one of these parameters is out of range, the annunciator triggers the shutdown of the engine and displays the fault condition, generally according to a sensor number. It is particularly important to monitor engine speed, because of the damage to the engine that can occur in a short period of time if engine speed exceeds acceptable levels.

Such remotely located engines are prevalent in oil field and pipeline locations where there may not be a readily available electric power supply. In such instances, annunciators must draw sufficiently low current to be powered from the Capacitor Discharge (CD) ignition of the engine being monitored or a magnetic pickup installed on the flywheel, and backed up by a small long life battery. In the field, CD ignitions are only able to supply a minimal amount of power to auxiliary equipment. Because of this, the drain or load of an annunciator must be minimal to avoid affecting the efficiency of the ignition system, especially during starting periods. Likewise since magnetic pickups are used to provide tachometer inputs, the drain or load of an annunciator must not degrade the pickup signal.

U.S. Pat. No. 4,336,463, expressly incorporated herein, discloses such a low power annunciator designed with digital logic. It is a disadvantage of such an annunciator, however, that it requires an external tachometer to monitor engine speed. External tachometers draw current and place an additional load on the ignition. Other disadvantages include increases in instrument count, instrument panel size, and instrument wiring, all of which increase overall instrument panel cost. A further disadvantage of using an external tachometer is the increased complexity of the overall system.

Incorporating a tachometer with an annunciator requires the addition of several logic functions including the sequential display of engine speed and fault conditions. The number of components required using digital logic makes this design approach prohibitive. While microprocessor-based annunciators operating at high speeds, such as Frank W. Murphy's S1501, can be programmed to perform the necessary logic and control the display, they draw too much current to be powered from a CD ignition or magnetic pickup. And while microprocessor-based annunciators operating at low speeds, such as Frank W. Murphy's Mark III and that disclosed in U.S. Pat. No. 5,563,456, expressly incorporated herein, draw sufficiently low current, their processing power is too limited to perform the necessary tachometer functions. Recent developments in technology, however, have resulted in peripheral-rich microprocessors that can be operated at low speeds with extremely low current draw and are capable of performing the necessary tachometer and display functions. Such a microprocessor is utilized in the present invention.

It is therefore an object of the present invention to provide a microprocessor-based annunciator with an internal tachometer that draws sufficiently low current to be powered from a CD ignition or magnetic pickup. The internal tachometer may advantageously include an overspeed shutdown setpoint and an underspeed shutdown setpoint.

It is a further advantage of the present invention that the internal tachometer can be easily calibrated to match timing pulses from the CD ignition of various engines or magnetic pickup pulses from various flywheels.

It is yet another advantage of the present invention that in addition to monitoring engine speed, it may also monitor engine run hours. U.S. Pat No. 4,181,883, expressly incorporated herein, discloses an hourmeter-tachometer similar to Frank W. Murphy's SHD30. It is an object of the present invention to provide an annunciator that incorporates the hourmeter-tachometer features of U.S. Pat No. 4,181,883.

It is yet another advantage of the present invention that it can accommodate normally open or normally closed sensor inputs without requiring hardware or software changes.

It is a still further advantage of the present invention that system information, such as tachometer calibration, overspeed and underspeed setpoints, and engine run hours are stored in nonvolatile memory. This ensures no data is lost, even when backup batteries are replaced.

The system according to the present invention may be implemented using a low power microprocessor programmed to carry out operations corresponding to the components described herein.

Other objects and advantages of the invention will become apparent to those skilled in the art during the course of the following detailed description.

DETAILED DESCRIPTION OF THE PREFERRED EMBODIMENT

Figure 1:
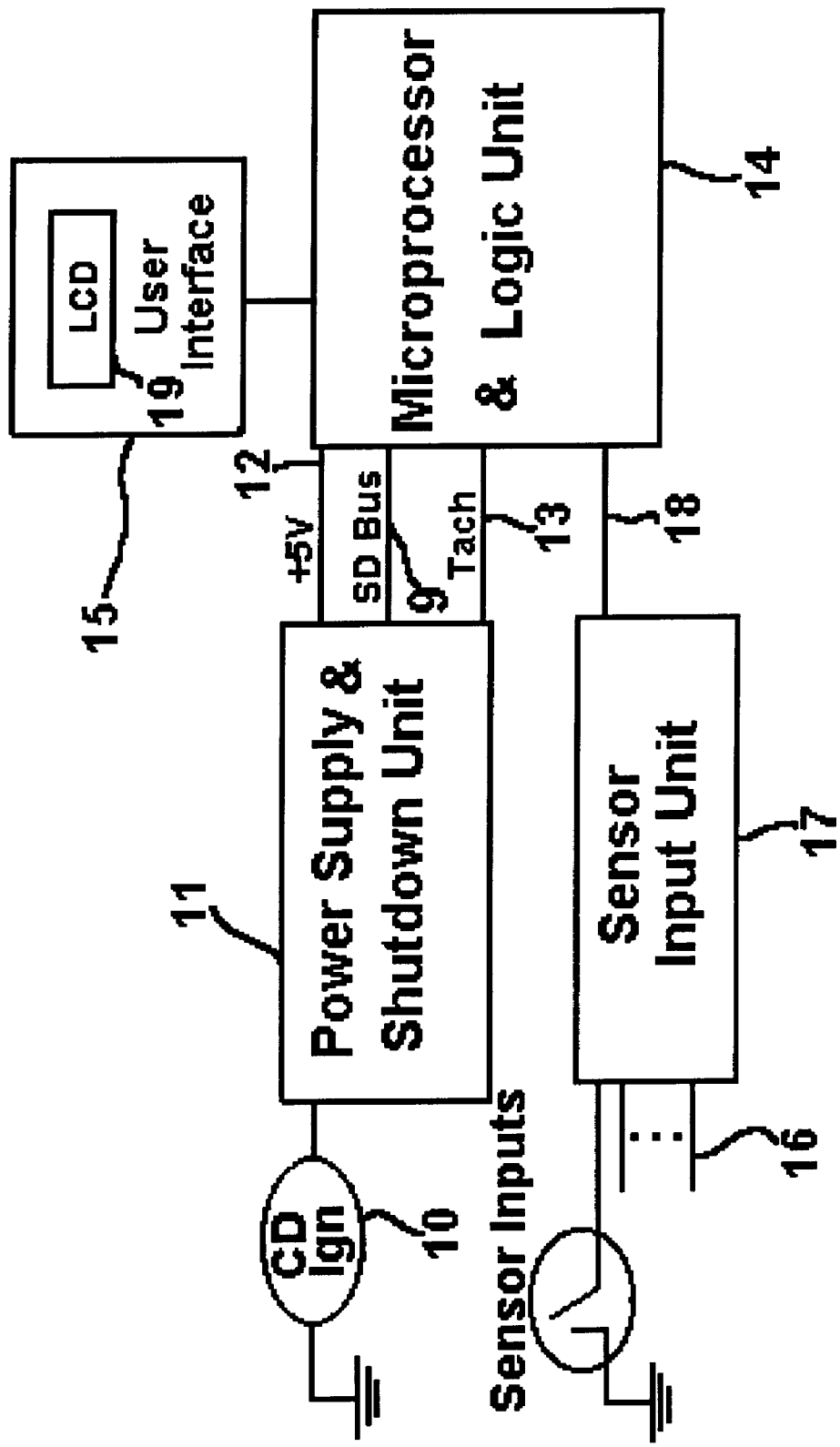
FIG. 1 shows a simplified block diagram of the annunciator according to the preferred embodiment of the invention.

Referring to the drawings in detail wherein like numerals designate like parts, FIG. 1 shows a simplified block diagram of the annunciator according to the preferred embodiment. The Power Supply and Shutdown unit 11 converts the CD Ignition signal 10 into 5 VDC 12 and tach signal 13, which it sends to the Microprocessor-based Logic Unit 14. The Microprocessor-based Logic Unit 14 scans the Sensor Input Unit 17 for a fault on one of the Sensor Inputs 16 via the sensor bus 18. If a fault is detected, the Microprocessor-based Logic unit 14 signals the Power Supply and Shutdown Unit 11 to shut down the engine via the fault shutdown bus 9, and displays the fault on the LCD 19. User commands and configuration are input via the User Interface 15, shown in greater detail in FIG. 2.

Figure 4:
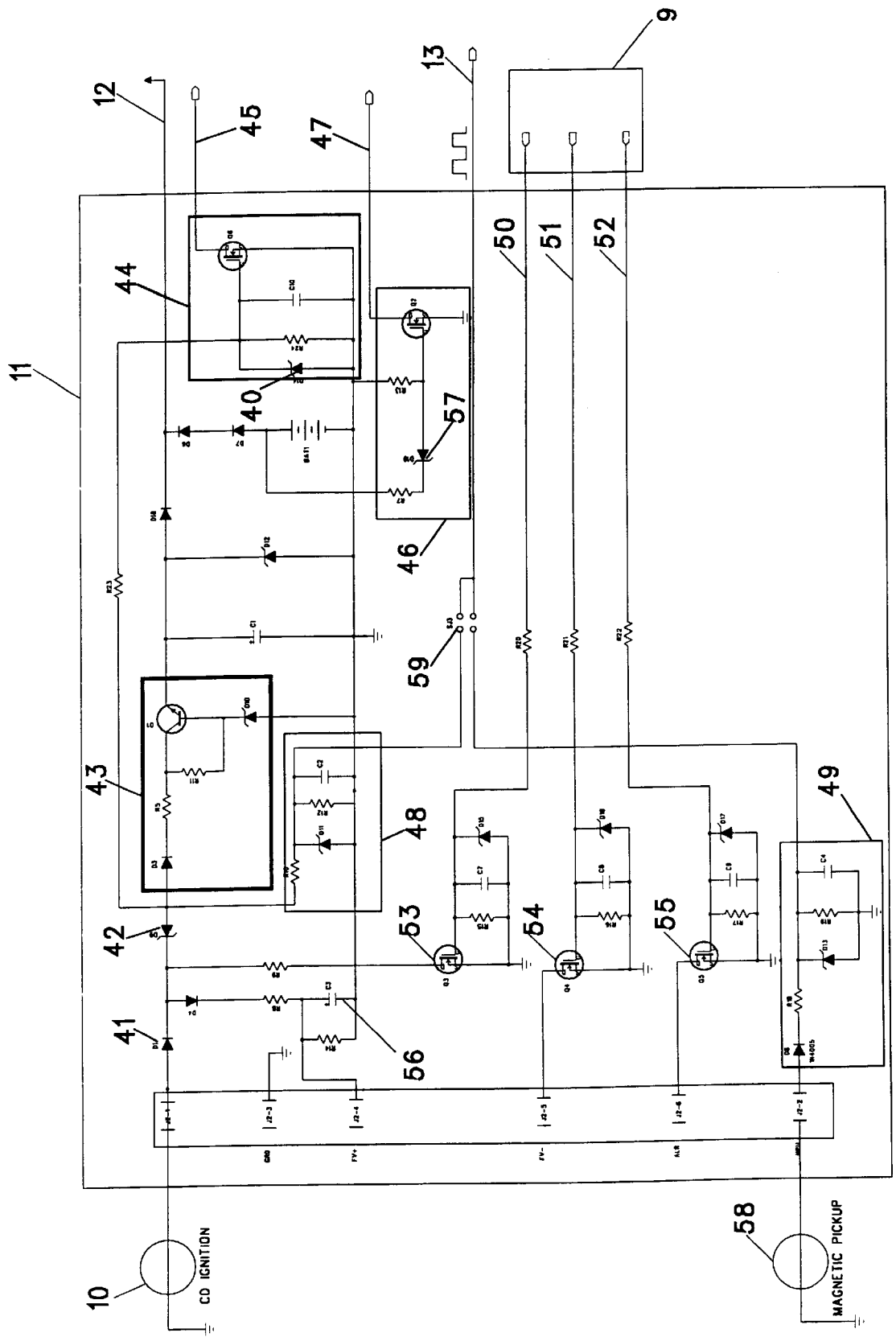
FIG. 4 shows a schematic diagram of the power supply and shutdown unit according to the preferred embodiment.
Figure 5:
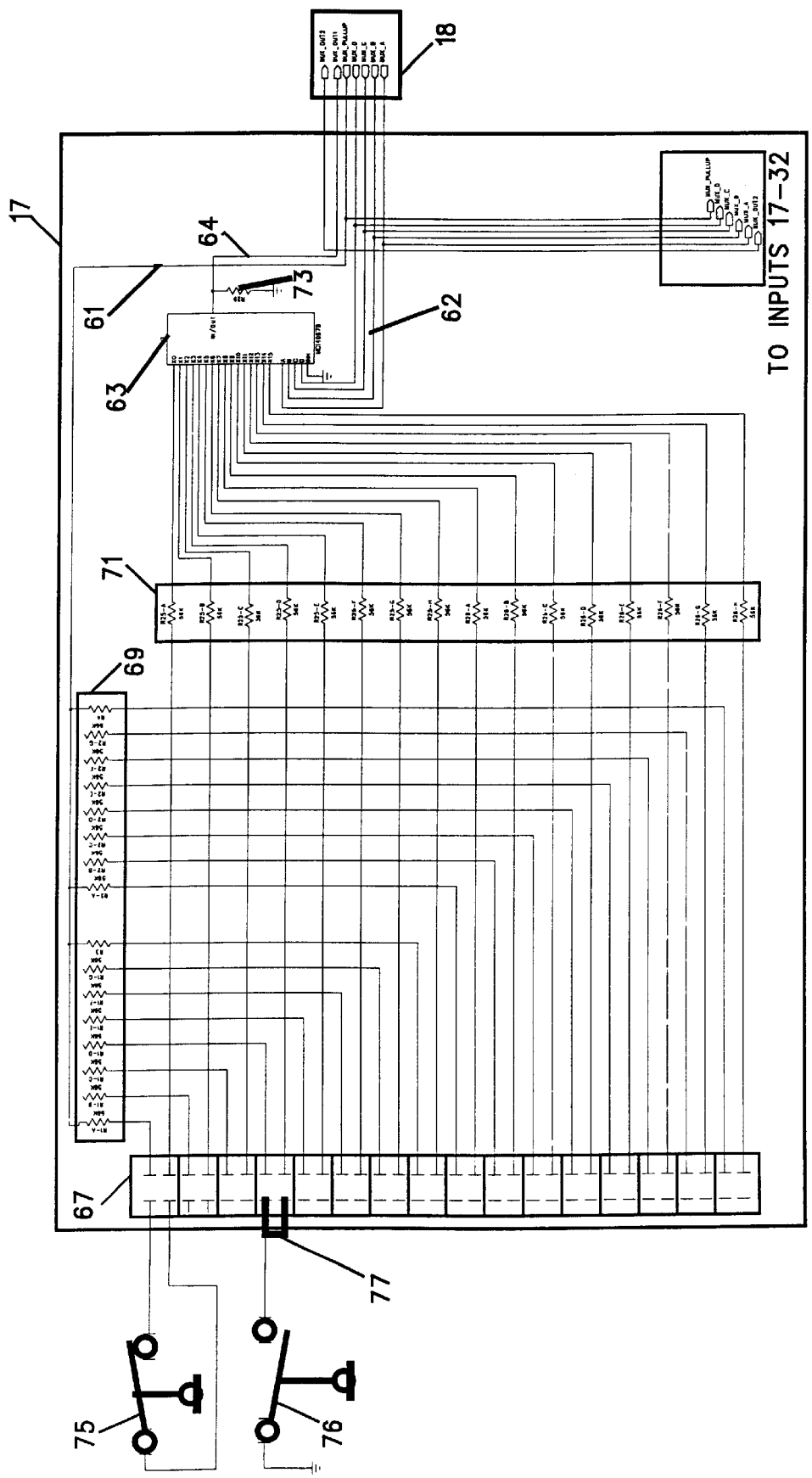
FIG. 5 shows a schematic diagram of the sensor input unit according to the preferred embodiment.
Figure 6:
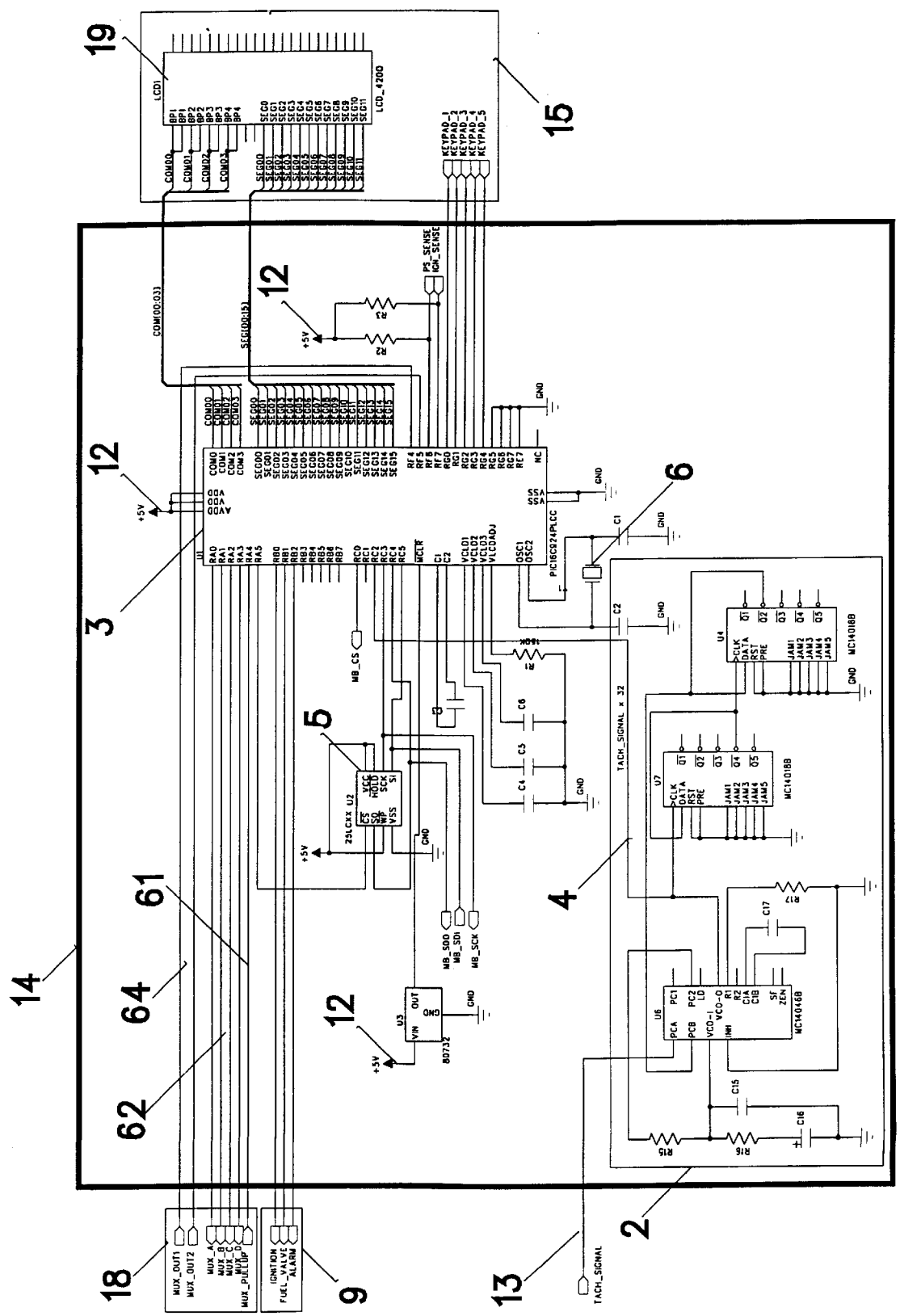
FIG. 6 shows a schematic diagram of the microprocessor and logic unit according to the preferred embodiment.

The numerous descriptors such as R, D, C, and J shown in FIGS. 4–6 that are not associated with reference numerals simply represent standard nomenclature for the items listed.

Power Supply and Shutdown Unit

FIG. 4 is a schematic diagram of the Power Supply and Shutdown Unit 11 according to the preferred embodiment. CD Ignition signal 10 is first applied to the reverse blocking diode 41, then to the zener diode 42. Zener diode 42 minimizes current draw until CD ignition voltage 10 exceeds its threshold voltage, assisting in engine start up. Once the threshold voltage of zener diode 42 is exceeded, the voltage is applied to regulator circuit 43, which regulates the voltage down to 5 VDC signal 12 which is supplied to Microprocessor-based Logic Unit 14 and Sensor Input Unit 17. When the engine is not running, backup battery 49 supplies power to the Microprocessor-based Logic Unit 14.

Ignition Voltage Detect circuit 44 monitors CD Ignition voltage 10 and detects a drop in voltage below the threshold voltage of zener diode 40, and signals the Microprocessor-based Logic Unit 14 via the Ignition Sense line 45.

Battery Voltage Detect circuit 46 monitors the voltage of backup battery 49 and detects a drop in voltage below the threshold voltage of zener diode 57, and signals the Microprocessor-based Logic Unit 14 via the Battery Sense line 47.

Simple component changes allow the same Power Supply to accept a Magnetic Pickup input as a power source. If Zener Diode 42 is eliminated, the threshold voltage of Zener Diode 40 can be lowered to match the voltage characteristics of a Magnetic Pickup. The Voltage Detect circuit 44 will then monitor the Magnetic Pickup voltage for a drop in voltage below the threshold of zener diode 40.

Independent of power source, the source of the tachometer signal can be either the CD ignition signal 10 or Magnetic pickup signal 58, which is selectable through jumper header 59. If the jumper is placed across pins 3 and 4 of jumper header 59, the ignition signal conditioning circuit 48 filters the ignition signal and supplies the tach signal 13 to the Microprocessor-based Logic Unit 14. If the jumper is placed across pins 1 and 2 of jumper header 59, the magnetic pickup signal conditioning circuit 49 filters the ignition signal and supplies the tach signal 13 to the Microprocessor-based Logic Unit 14.

The Power Supply and Shutdown Unit 11 receives shutdown signals from Microprocessor-based Logic Unit 14 via the Shutdown Bus 9. A high logic level on Ignition Ground Signal 50 turns on Ignition Ground transistor 53, grounding the ignition and shutting down the engine. A high logic level on Fuel Valve Signal 51 turns on Fuel Valve Trip transistor 54, dumping the energy stored in Fuel Valve Trip Capacitor 56, tripping the fuel valve, cutting off fuel to the engine. A high logic level on Alarm Signal 52 turns on Alarm transistor 55, signaling an external alarm device.

Sensor Input Unit

FIG. 5 is a schematic diagram of one half of the Sensor Input Unit 17, each half handling 16 sensor inputs. The number of Sensor Inputs that can be accommodated by the Sensor Input Unit 17 is easily expanded with additional multiplexors. Likewise, the sensor inputs could be run straight into the inputs of the microprocessor 3, eliminating the need for multiplexors. The Sensor Input Unit 17 is scanned by the Microprocessor-based Logic Unit 14 via the Sensor Bus 18.

The Microprocessor-based Logic Unit 14, addresses multiplexor 63 with address lines 62, while pulling Mux Pullup Line 61 high, which applies a voltage to pullup resistors 69. If the addressed sensor input is not faulted, mux output line 64 goes high. If the addressed sensor input is faulted, mux output line 64 goes low, and the Microprocessor-based Logic Unit initiates a shutdown as described below. Current limiting resistors 71 protect the input buffers of multiplexor 63 from high voltage applied at terminal block 67.

Sensors Switches are available in two configurations: Normally Closed and Normally Open. Normally Closed Switch 75 is closed in the normal state, and opens upon reaching a fault condition. Conversely, Normally Open Switch 76 is open in the normal state, and closes upon reaching a fault condition. Manufacturing methods and preferences dictate which configuration is offered. The Sensor Input Unit 17 of the preferred embodiment can handle any combination of normally open or normally closed switches.

Normally closed switch 75 requires two wires run to terminal block 67. While the switch remains closed, mux output line 64 is pulled up through resistors 69. When the switch opens, however, mux output line 64 is pulled low through pull down resistor 73.

Normally open switch 76 requires one wire run to terminal block 67, one wire to ground, and the use of shunt jumper 77 across its input terminals. While the switch remains open, mux output line 64 is pulled up through resistors 69. When the switch closes, mux output line 64 is pulled to ground through the sensor.

Microprocessor-Based Logic Unit

FIG. 6 is a schematic diagram of the Microprocessor-based Logic Unit 14. The microprocessor 3, is programmed to perform the core logic functions of the annunciator: scanning the Sensor Input Unit 17 via Sensor Bus 18, monitoring engine speed, controlling engine shutdown via Shutdown Bus 9, and monitoring the user interface 15. It is critical that microprocessor 3 operate at a low clock frequency to keep the current draw at a minimum. In the preferred embodiment, crystal oscillator 6 has a 32.768 kHz frequency, which results in a current draw of approximately 50 microamps for microprocessor 3.

During normal operation, the microprocessor scans the Sensor Input Unit 17 every second, via the Sensor Bus 18, as described above. The microprocessor addresses two multiplexors simultaneously; checking two sensor inputs at a time via Mux Output Lines 64, allowing for faster scan times. Each pair of points is addressed sequentially via Mux Address Lines 62, and the status of each sensor input is stored in the microprocessor's memory. Mux Pullup Line 61 is pulled low after a complete scan to prevent a faulted sensor input from drawing current through pullup resistors 69 on the Sensor Input Unit. Scanning an additional 16 inputs by adding a multiplexor to Sensor Input Unit 17 would require only one additional line into microprocessor 3 for the output of the added multiplexor.

Since microprocessor 3 does not have extensive built in math functions, calculating engine RPM from tach signal 13 presents a problem. If microprocessor 3 were operating at a higher clock speed, math functions capable of calculating RPM from a single period of tach signal 13 could be implemented using basic assembly instructions. But with microprocessor 3 operating at 32.768 kHz, the calculations would take too long considering the other functions that must be performed.

To solve this problem, the present invention utilizes a counter and a timer, both peripheral features of microprocessor 3. The counter, which is capable of counting high speed pulses, is programmed to count pulses from tach signal 13 in the background. The timer is then programmed to generate periodic interrupts, during which the counter is read then reset to zero. If the number of pulses that tach signal 13 produces per engine revolution is known, the period of these interrupts can be calculated so that the number of tach signal pulses counted is equivalent to engine RPM. This ideal interrupt period, or "gate time," Tgate, can be calculated using the following equation:

$$Tgate = (60/pulse\_per\_revolution)S.$$

Utilizing this method, microprocessor 3 does not have to perform any calculations, it merely reads the counter registers to obtain the engine RPM.

A further problem is presented when utilizing this method, however, if the number of pulses per revolution of tach signal 13 is low. The problem is that the gate time will be too long to provide updated RPM readings of adequate frequency to protect the engine against overspeed. For example, if the pulses per revolution is 6, the interrupt period, Tgate=60/6, or 10 seconds. An engine could be destroyed if the engine RPM is out of range for that long a time. The present invention overcomes this problem by conditioning tach signal 13 with phase locked loop circuit 2. This results in secondary tach signal 4 which is equivalent to tach signal 13 multiplied in frequency by 32. Using secondary tach signal 4 to calculate a gate time (Tgate') yields the following equation with the gate time reduced by a factor of 32:

$$Tgate' = ((60/pulse\_per\_revolution)/32)s.$$

Using the same example as above, with pulse per revolution of 6, the new gate time, Tgate'=(60/6)/32, or 0.3125 seconds, which provides adequate time to respond to an overspeed condition.

Pulses per revolution for a particular engine are entered by the user to calibrate the tachometer. The number of pulses per revolution from a CD ignition system is determined by the following equation:

$$Pulses\_Per\_Revolution = Cylinders/2 * Engine\_Cycles.$$

The number of pulses per revolution from a magnetic pickup is simply the number of teeth in the ring gear the pickup senses. In the preferred embodiment, pulses per revolution are stored in non-volatile memory 5, as are overspeed and underspeed setpoints used to trigger shutdowns. Alternatively, battery-backed RAM or dip switches could be used to store pulses per revolution, overspeed and underspeed setpoints, as described in U.S. Pat No. 4,181,883. Engine RPM is compared to overspeed and underspeed setpoints every 0.5 seconds. If engine RPM is out of range, a shutdown occurs. Numeric codes "50" and "51" are annunciated to indicate overspeed and underspeed, respectively.

In the preferred embodiment, as long as the annunciator senses the engine is running, an internal hourmeter keeps track of engine run hours. The internal hourmeter utilizes a separate timer, which is also a peripheral feature of the microprocessor, programmed for half second "real time" interrupts and a software counter. Every 720 counts (=360s), the internal hourmeter is incremented 1/10 hour. The run hours are periodically stored in non-volatile memory 5.

If the Microprocessor-based Logic Unit 14 senses a Normal Shutdown, as described below, or a fault condition from either the Sensor Inputs, Engine Overspeed, or Engine Underspeed, it shuts the engine down via the Shutdown Bus 9, as described above.

While running, the Microprocessor-based Logic Unit 14 constantly supplies information to the display 19, and receives user input from the user interface 15, as described below.

User Interface and Sequence of Operations

Figure 2:
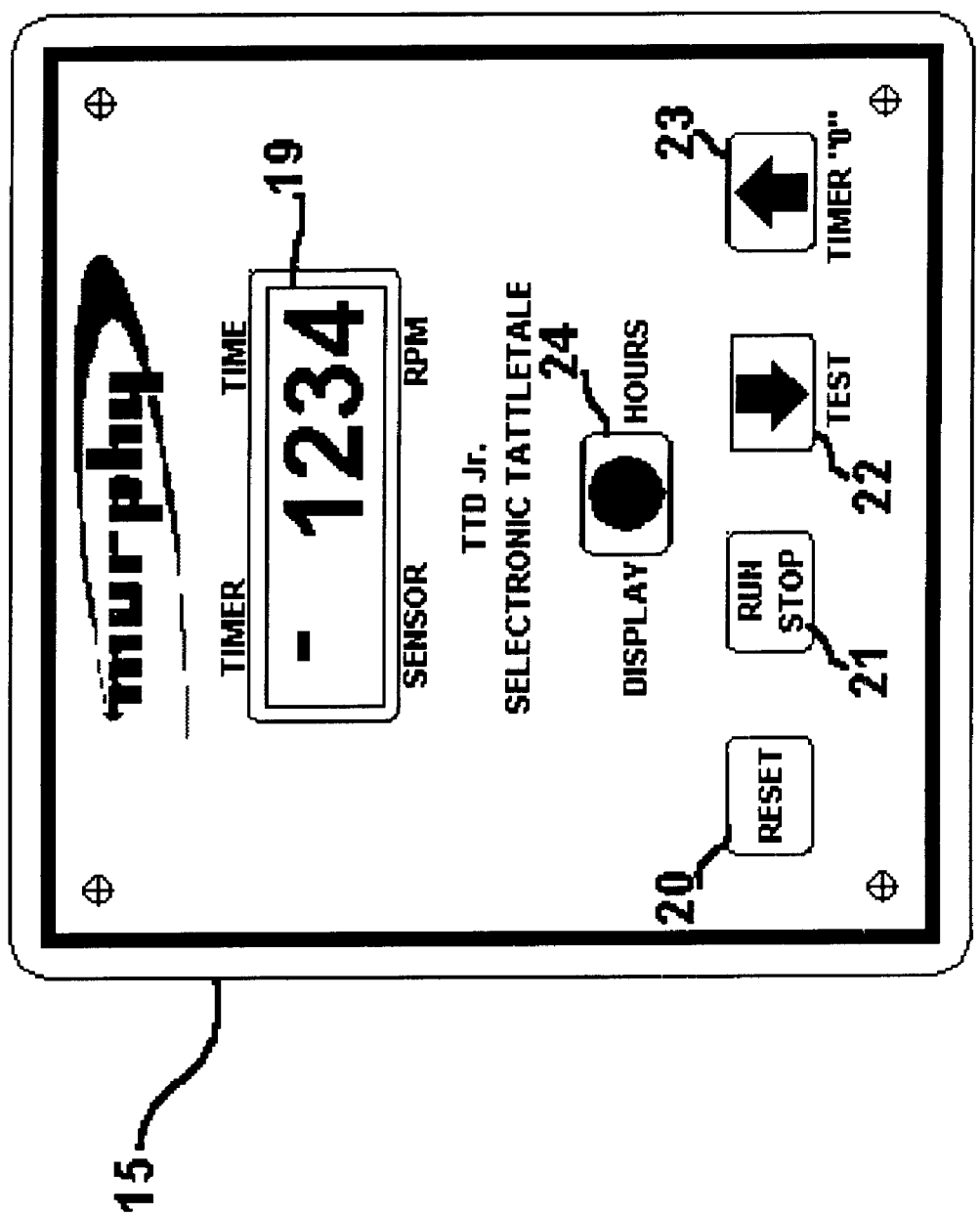
FIG. 2 shows the user interface, according to the preferred embodiment, comprising a faceplate, keypad and liquid crystal display (LCD).

The user interface 15 shown in FIG. 2, comprises a liquid crystal display (LCD) 19, and membrane switches 20–24. When the user approaches the annunciator with the engine shutdown, the LCD 19 displays the last fault, as illustrated in FIG. 3A, with the faulted Sensor Number 25 to the left and the status 26 to the right.

To reset the fault, the user presses the RESET button 20. The LCD 19 then displays the lockout timers, as illustrated in FIG. 3B, with the Timer Number 27 to the left, and the Remaining Time 28, in seconds, to the right. The lockout timers inhibits user selectable sensor inputs that are engine speed dependent, such as oil pressure, until the engine has come up to speed. All other Sensor Inputs 16, are scanned at this time. There are 2 independent lockout timers, allowing sensors that take longer to clear to be locked out for different periods. The user may zero out the displayed timer by pressing the Timer "0" button 23.

Once the lockout timers have expired, all of the Sensor Inputs 16 are scanned. At this time, the LCD 19 displays Engine RPM 29, as shown in FIG. 3C, continuously until a fault condition occurs or the user presses one of the following buttons: RESET 20, RUN STOP 21, TEST 22, or DISPLAY HOURS 24.

Figure 3:
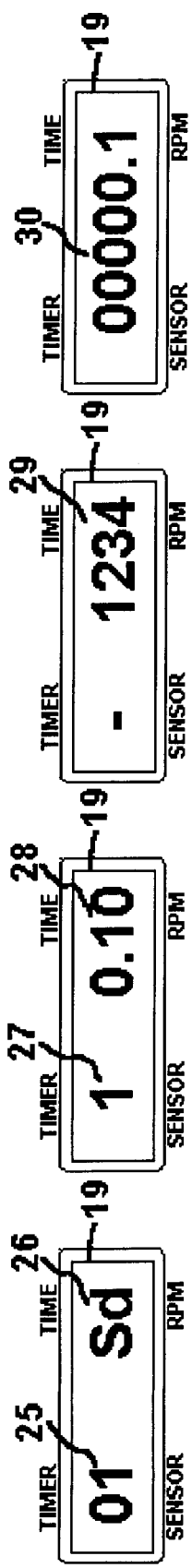
FIGS. 3A–3D show the LCD displaying different information according to the preferred embodiment.

If the user presses the RESET button 20, the lockout timers are reinitialized, and will be displayed on the LCD 19, as shown in FIG. 3B.

If the user presses the RUN STOP button 21, a normal shutdown will occur, with the ignition grounded and fuel valve tripped, but the alarm is not dropped out. A normal stop is annunciated by a numeric code "52."

If the TEST button 23 is pressed, a test timer is initiated and displayed. While the test timer is active, all points are inhibited from shutdown, but are displayed on the LCD 19 when faulted, as shown in FIG. 3A, allowing the user to test system operation and wiring. The user may zero the Test Timer by pressing the Timer "0" button 23, and return to a normal run condition.

If the DISPLAY HOURS button 24 is pressed, the LCD 19 displays the Engine Run Hours 30, as shown in FIG. 3D, for 5 seconds.

Once a fault shutdown occurs, the alarm is dropped out, the fuel valve is tripped and, after a short delay, the ignition is grounded, shutting down the engine. The delay between tripping the fuel valve and grounding the ignition allows fuel to burn out of the system decreasing the likelihood of backfires on startup. Overspeed and Emergency shutdown conditions bypass this delay, grounding the ignition immediately. Once the engine is shutdown, the LCD 19 displays the fault, as illustrated in FIG. 3A, until the user presses the RESET button 20, as described above.

In the preferred embodiment, an operator is allowed to enter system information, such as pulsesper-revolution of the engine, overspeed and underspeed setpoints, and timer values, via the keypad. The engine must first be shutdown normally with the RUN-STOP button 21, as indicated by numeric code "52." After the normal stop, the operator must press and hold the RUN-STOP button 21 and the TIMER-0 button 23 simultaneously for approximately 5 seconds. After that, setup menus prompt the operator to enter system information. All system information entered by the operator is stored in non-volatile memory 5, which retains the information even if backup battery 49 is removed.

In the preferred embodiment, a shutdown history is created by storing in non-volatile memory 5 the sensor number of the last 5 shutdowns along with the engine run hours at the time the shutdown occurred.

The preferred embodiment is described by way of illustration. The description of the preferred embodiment is not intended to limit the scope of the claims. One of ordinary skill in the art would recognize that various modifications to the described preferred embodiment may be made without departing from the spirit and hope of the invention.

We claim:

1. An annunciator for use with an internal combustion engine comprising:
    (a) a sensor input unit in communication with a plurality of parallel connected sensor inputs which change state when a fault condition occurs;
    (b) input means which a human can use to enter information;
    (c) a common display means for sequentially displaying information, such as fault conditions and engine speed;
    (d) a microprocessor-based logic unit which monitors said sensor input unit for a fault condition, monitors said input means for information entered by an operator, sequentially updates said display means, generates shutdown signals in response to said fault conditions, and measures engine speed in response to a tachometer signal, the frequency of which is indicative of the speed of the engine;
    (e) shutdown means responsive to said shutdown signals generated by said microprocessor-based logic unit; said shutdown means being capable of shutting down the engine;
    (f) a power supply which supplies power to said microprocessor-based logic unit and said sensor input unit only while the engine is running; and
    (g) a backup battery that supplies power to at least said microprocessor-based logic unit while the engine is not running.

2. The annunciator device according to claim 1, wherein said power supply is a CD ignition power supply.

3. The annunciator device according to claim 1, wherein said power supply is a magnetic pickup power supply.

4. The annunciator device according to claim 1, wherein said microprocessor-based logic unit also measures engine run hours.

5. The annunciator device according to claim 4, wherein said power supply is a CD ignition power supply.

6. The annunciator device according to claim 4, wherein said power supply is a magnetic pickup power supply.

* * * * *